United States Patent [19]

Horwitz et al.

[11] Patent Number: 5,100,585
[45] Date of Patent: Mar. 31, 1992

[54] PROCESS FOR THE RECOVERY OF STRONTIUM FROM ACID SOLUTIONS

[75] Inventors: E. Philip Horwitz, Naperville; Mark L. Dietz, Evanston, both of Ill.

[73] Assignee: United States Department of Energy, Washington, D.C.

[21] Appl. No.: 506,125

[22] Filed: Apr. 9, 1990

[51] Int. Cl.$^5$ .................... G21C 19/46; G21C 19/42; C02F 1/26
[52] U.S. Cl. .................... 252/631; 252/626; 252/627; 210/682; 210/685
[58] Field of Search .................. 252/627, 626, 631; 210/682

[56] References Cited

U.S. PATENT DOCUMENTS

| | | | |
|---|---|---|---|
| 4,363,765 | 12/1982 | Fiato et al. | 260/429 |
| 4,452,702 | 6/1984 | Blasivs et al. | 210/638 |
| 4,460,474 | 7/1984 | Blasivs et al. | 210/679 |
| 4,726,938 | 2/1988 | Rollat et al. | 423/21.5 |
| 4,749,518 | 6/1988 | Davis, Jr. et al. | 252/627 |
| 4,917,825 | 4/1990 | McDowell et al. | 252/631 |

OTHER PUBLICATIONS

Pedersen et al., Macrocyclic Polyethers and Their Complexes, Angew. Chpm. Internat. Edit., vol. 11, 1972, No. 1.
Gerow et al., Extraction of Cs+ and Sr$^{2+}$ From HNO$_3$ Solution Using Macrocyclic Polyethers, Separation Science and Technology, 16(5), pp. 519–548, 1981.
Antaya et al., Radiation Stability of Organic Extractants Used in Nuclear Waste Treatment, Proc. 2nd World Congress of Chem. Engr., vol. II, p. 8, Montreal, 1981, Oct. 4–9.
Tashmukhamedov et al., The Study of Ionophoril Effect of Some New Derivatives of Cyclic Polyethers ... , 93, Chem. Abs. (#23), ABS #216, 956j.
Antaya, B. L., Cesium Extract From HNO$_3$ ... , M.S. Thesis, Univ. of South Carolina, 1981.
Gerow, I. H., The Use of Macrocyclic Polyethers to Remove CS$^{137}$ From Acid ... , PhD Thesis, Univ. of South Carolina, 1979.
Shulpr, R. G., Experimental Measurement of Distribution Coefficients ... , M. S. Thesis, Univ. of South Carolina, 1982.

Primary Examiner—Brooks H. Hunt
Assistant Examiner—Daniel J. Jenkins
Attorney, Agent, or Firm—James W. Weinberger; Thomas G. Anderson; William R. Moser

[57] ABSTRACT

The invention is a process for selectively extracting strontium and technetium values from aqueous nitric acid waste solutions containing these and other fission product values. The extractant is a macrocyclic polyether in a diluent which is insoluble in water, but which will itself dissolve a small amount of water. The process will extract strontium and technetium values from nitric acid solutions which are up to 6 molar in nitric acid.

16 Claims, 5 Drawing Sheets

PROCESS FOR THE RECOVERY OF STRONTIUM FROM ACID SOLUTIONS

CONTRACTUAL ORIGIN OF THE INVENTION

The United States Government has rights in this invention pursuant to Contract No. W-31-109-ENG-38 between the U.S. Department of Energy and the University of Chicago.

BACKGROUND OF THE INVENTION

This invention relates to a process for the separation and recovery of strontium values from nuclear wastes. More specifically, this invention relates to a process for the separation of recovery of strontium values from nuclear waste reprocessing solutions containing these values together with actinide and other fission product values.

The removal of $^{90}Sr$ from acidic high-level liquid waste (HLLW) resulting from the processing of spent nuclear reactor fuels has long been recognized as a special problem. Strontium-90, together with $^{137}Cs$ is one of the major generators of heat in nuclear waste. Thus, their presence complicates waste management options. The radioactive waste process stream from spent fuel reprocessing contains the transuranium elements (TRU), in addition to strontium and other components, in a solution with a high acid content on the order of 1 to 6 molar nitric acid. Because of the long-lived nature of the TRU elements, it is anticipated that they will have to be stored in geologically stable storage facilities for periods of time up to one million years. The strontium in the waste stream, if left in the waste as it is solidified for storage, will provide a significant amount of heat which must be removed from the stored solid waste. Thus, it is imperative that a satisfactory method be found for the removal of the strontium from the high-level liquid wastes before they can be solidified into a form suitable for long term storage.

Strontium-90, because of the heat which it generates, is also valuable as a reliable source of thermal energy for use in radioisotopic thermal electric generators.

A number of investigators have studied the separation of strontium from high level liquid wastes contained in strong acid solutions. Some work has focused on the use of a cobalt dicarbolyde as the extractant. The polyhedral dicarbolyde complexes of cobalt possess strong hydrophobic features which enable them to extract both $Cs^{1+}$ and $Sr^{2+}$ from nitric acid solutions in the concentration range of 0.01 to 0.1M (Sr) and up to 4-6M $HNO_3$ (Cs) However, nitrobenzene, a highly toxic solvent, is the required diluent for this process. The presence of polyethylene glycols will also increase the distribution ratios of $Sr^{2+}$, $Cs^{1+}$ and trivalent metal ions, e.g. rare earths and transplutonium ions.

The macrocyclic polyethers ("crown ethers") such as dicyclohexano-18-Crown-6 (DCH18C6) have also been studied as strontium extractants. Many of these studies have utilized relatively volatile chlorinated hydrocarbons such as 1,1,2,2- tetrachloroethane, 1.2-dichloroethane and dichloromethane as diluents. These diluents are unsuitable for use in production facilities due to their toxicity and the potential for generating hydrochloric acid on radiolysis which is highly corrosive to process equipment. Furthermore, distribution ratios of strontium decrease rapidly when the nitric acid concentration of the feed solution exceeds about 2.0M.

Strontium extraction from acidic media by crown ethers is enhanced by using conventional acidic extractants such as bis(2-ethylhexyl)phosphoric acid (HDEHP) or dinonylnaphthalene sulfonic acid (DNNS). It has been shown that HDEHP and DNNS replace the relatively hydrophilic nitrate ion with a very lipophilic anion, significantly enhancing Sr recovery. To extract Sr from Purex raffinate, a four component process solvent formulation was developed consisting of 0.05M crown ether, 0.1M DNNS, and 25% tri-butyl phosphate (TBP) in a paraffinic hydrocarbon diluent. Although this 4-component system is the only process proposed for Sr extraction that is compatible with the PUREX process, effective back extraction of strontium from the extractant is highly inefficient making the process impractical.

The extraction of the nitrates of magnesium, calcium, strontium, and barium from nitric acid has also been tried using the crown ether, dicyclohexano-18- crown-6 (DCH18C6) in dichloroethane. Once again, as the concentration of $HNO_3$ is increased, the distribution coefficient passes through a maximum at 1.5 to 2.0 mole/liter $HNO_3$, with the extraction coefficients decreasing rather sharply with increasing concentrations of $HNO_3$.

Still another study investigated the effect of other crown ethers on the extraction of strontium from a medium activity nuclear waste solution. The best distribution ratios were obtained with DCH18C6 in 1,1,2,2-tetrachloroethane from a solution containing 1.25 mol/l of $HNO_3$, falling off rapidly at higher acid concentrations. Other diluents which gave similar results include chloroform, dichloromethane and nitrobenzene. While diluents such as chloroform, 1,2-dichloroethane, and 1,1,2,2-tetrachloroethane will elevate Sr distribution ratios to practical levels, these solvents are unacceptable in processing plants because of their toxicity and because of their generation of corrosive HCl on radiolysis.

All of the studies on the use of the various crown ethers in acceptable diluents show that the crown ethers are ineffective extractants for the recovery of strontium from nitric acid solutions. This is believed to be due to the need for the extractant to dehydrate the nitrate complex in order for it to transfer into the nonaqueous medium. In the case of $Sr^{2+}$, however, the charge density of the dehydrated ion encircled by the cyclic polyether is probably insufficient to dehydrate the nitrate ion. Therefore, distribution ratios are quite low because of the energy required to transfer the hydrated anions into the organic phase. Since the acid concentration of most of the high-level waste solutions can range from 1 to 6 molar, the use of crown ethers is ineffective for the recovery of strontium from most of these solutions without considerable neutralization of the solutions, adding to the solution volume for which storage must ultimately be provided.

What is needed is an extraction system which can efficiently recover strontium values from aqueous solutions containing strontium and other fission product values and which contain up to about 6.0M in nitric acid and which is compatible with stainless steel and does not utilize a toxic solvent.

SUMMARY OF THE INVENTION

It has been found that by using a diluent for the crown ether which will dissolve water, but which itself is insoluble in water, the crown ether/diluent extractant will extract strontium and technetium values from aqueous solutions containing strontium, technetium, and other fission product values and containing up to 6 molar nitric acid. Furthermore, the recovery of strontium and technetium values is improved with increasing nitric acid concentrations in the feed solution. By the process of the invention, the aqueous feed solution containing strontium, technetium and other fission product values and containing up to 6 molar nitric acid, is contacted with an extractant consisting of a crown ether in a diluent, the diluent being an organic compound which is insoluble in water, is capable of dissolving a substantial quantity of water, and in which the crown ether is soluble, maintaining this contact for a period of time sufficient for the strontium and technetium values in the aqueous acid solution to be extracted into the extractant, and separating the extractant from the aqueous solution, thereby separating the strontium and technetium values from the aqueous solution.

The process of the invention may be used with the non-transuranium element-containing high-level nitric acid waste stream (the raffinate) from the TRUEX process or it may be used as a separate process to recover strontium and/or technetium values from nitric acid-containing waste streams.

It is therefore one object of the invention to provide a process for the recovery of strontium values from acidic waste solutions containing strontium values together with other fission product values.

It is another object of the invention to provide a process for the recovery of strontium and technetium values from aqueous nitric acid solutions.

It is still another object of the invention to provide a process for the recovery of strontium and technetium values from aqueous nitric acid solutions containing up to 6 molar nitric acid.

Finally, it is the object of the invention to provide a process which utilizes crown ethers for the recovery of strontium and technetium values from aqueous nitric acid waste streams containing up to 6 molar nitric acid.

DETAILED DESCRIPTION OF THE INVENTION

Figure 1:
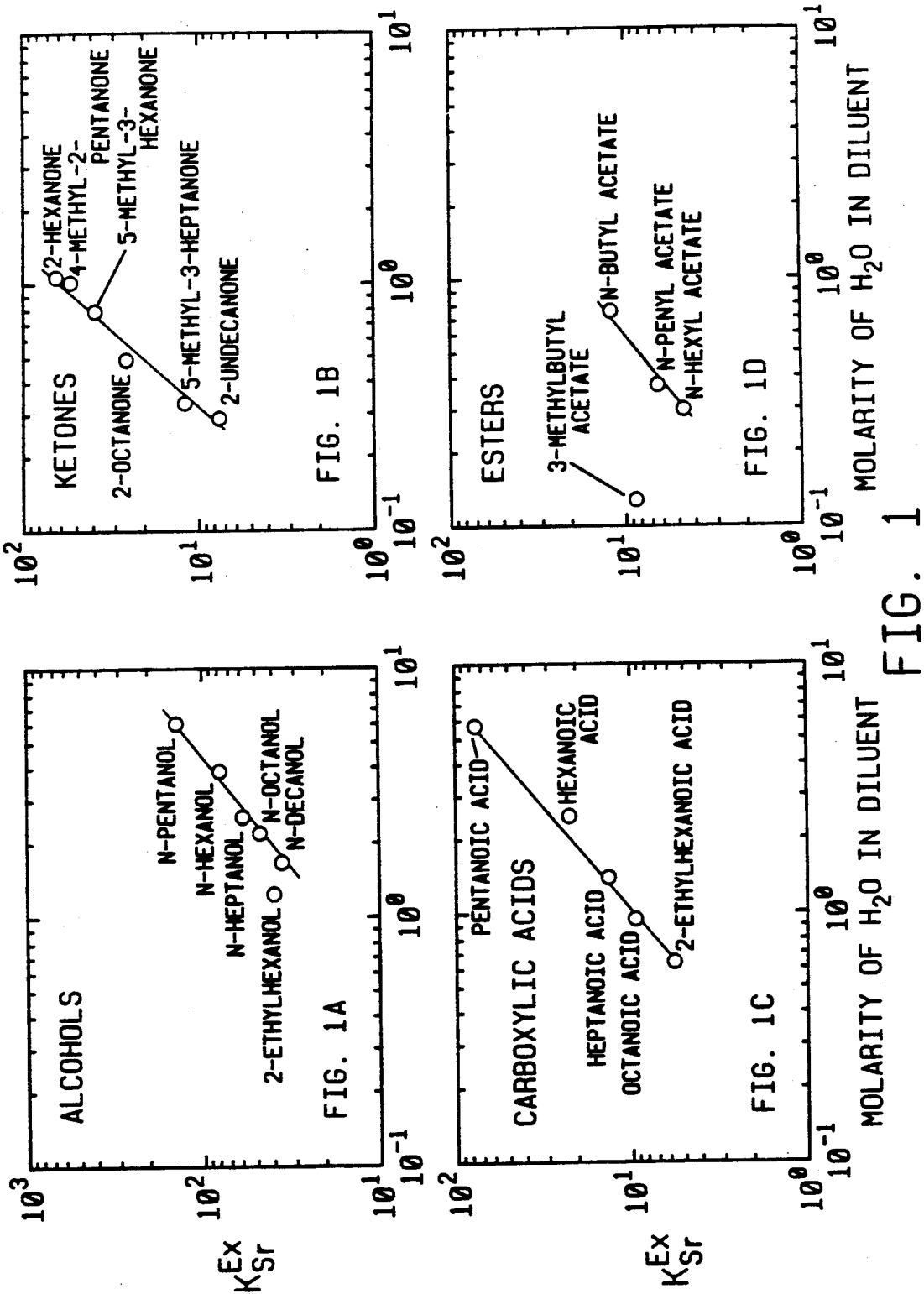
FIG. 1 is a series of graphs showing the relationship between the extraction constant for Sr and the molarity of water in various diluents containing dicyclohexano-18-crown-6 (DCH18C6).

These and other objects of the invention for the recovery of strontium and technetium values from an aqueous nitric acid feed solution containing these and other fission product values may be met by preparing an extractant of about 0.2M bis-4,4'(5')[(t-butyl)cyclohexano]-18-Crown-6 (Dt-BuCH18C6) in 1-octanol as a diluent, contacting the extractant with the aqueous solution which is up to 6M in nitric acid, maintaining the contact for a period of time sufficient for the strontium and technetium values to be taken up by the extractant, and separating the extractant from the aqueous solution, thereby separating the strontium and technetium values from the aqueous solution.

The macrocyclic polyether may be any of the dicyclohexano crown ethers such as dicyclohexano-18-Crown-6, dicyclohexano 21-Crown-7, or dicyclohexano-24-Crown-8. The preferred crown ethers have the formula: 4,4'(5')[(R,R')dicyclohexano]-18-Crown-6, where R and R' are one or more members selected from the group consisting of H and straight chain or branched alkyls containing 1 to 12 carbons. Examples include, methyl, propyl, isobutyl, t-butyl, hexyl, and heptyl. The preferred ethers include dicyclohexano-18-crown-6 (DCH18C6) and bis-methylcyclohexano-18-crown-6 (DMeCH18C6). The most preferred ether is bis-4,4'(5')[(t-butyl)cyclohexano]-18-Crown-6 (Dt-BuCH18C6). The amount of crown ether in the diluent may vary depending upon the particular form of the ether. For example a concentration of about 0.1 to 0.5M of the t-butyl form in the diluent is satisfactory, with 0.2M being the most preferred. When the hydrogen form is used, the concentration may vary from 0.25 to 0.5M. Concentrations above about 0.5M of the ether in the diluent will not improve strontium recovery when R and R' are H.

The diluent is an organic compound which has a high boiling point, i.e. about 170° to 200° C., limited or no solubility in water, is capable of dissolving from about 0.5 to 6.0M water, and in which the crown ether is soluble. These diluents include alcohols, ketones, carboxylic acids and esters. Suitable alcohols include 1-octanol, which is most preferred, although 1-heptanol and 1-decanol are also satisfactory. The carboxylic acids include octanoic acid, which is preferred, in addition to heptanoic and hexanoic acids. Ketones which meet the criteria may be either 2-hexanone or 4-methyl-2-pentanone, while the esters include butyl acetate and amyl acetate. One required characteristic of the diluent is that it must be able to dissolve a minimum amount of water. This amount varies with the particular diluent. For alcohols and carboxylic acids the amount of water may vary from about 1.0 to 6.0M, while ketones and esters should dissolve from about 0.5 to 1.0M of water. Although diluents capable of dissolving larger quantities of water are satisfactory from the process standpoint, their use may result in greater losses of extractant and diluent during the process.

While we do not wish to be bound by this explanation, it appears that the reason for the low distribution values of strontium in the non water-dissolving diluents is that the nitrate anion remains hydrated on extraction because of the low charge density of $Sr^{2+}$. Hydrated anions are hydrophilic and thus will not readily transfer into a lipophilic medium. By the use of a diluent which can contain dissolved water, an environment is provided in which the anion need not dehydrate to be solvated. By avoiding anion dehydration, additional free energy of extraction is achieved. It is not necessary that the diluent be saturated with water before contact of the extractant with the aqueous nitric acid containing waste solution because the water for dissolution in the diluent is obtained from the aqueous waste feed solution.

The volume ratio between the organic extractant and the aqueous acid feed solution depends upon the particular extractant system, i.e. the particular crown ether and diluent system. Generally these ratios may vary from about 1:1 to 1:4. For the extractant system consisting of bis-4,4'(5')[(t-butyl)cyclohexano]-18-Crown-6 in 1-octanol, the preferred ratio is 1:3. For dicyclohexano-18-crown-6, a 1:2 ratio is preferred.

The extraction process is preferably run at ambient temperature since higher temperatures have little effection on extraction. Contact times at ambient temperature are short, typically on the order of about 0.5 minutes to provide complete extraction of the strontium and technetium values.

Stripping the extracted strontium and technetium values from the extractant can be readily accomplished by contacting the extractant with water.

A major advantage of the process of the invention is the stability of the crown ether-diluent systems to radiolysis. Exposure of DCH18C6 in octanol to an absorbed dose of 10 watt-hours/liter showed no change in strontium distribution ratios on extraction and stripping and on phase disengagement time. It is believed that any radiolytic degradation products formed are water soluble and therefore would be removed during extraction, scrubbing, and stripping cycles.

The following examples are given to illustrate the invention but are not to be taken as limiting the scope of the invention which is defined in the appended claims.

EXAMPLES

The crown ethers dicyclohexano-18-crown-6 (DCH8C6) (99% pure), and bis-4,4'(5')[(t-butyl)cyclohexano]-18-crown-6 (Dt-BuCH18C6) were used without further purification. The extraction of $HNO_3$ by the various solvents was measured by equilibrating the organic phase four times with a 1M $HNO_3$ solution using an organic to aqueous phase ratio of 3. The resultant organic phase was stripped of acid by repeated water washings and the washings titrated with standard sodium hydroxide. All distributions of Sr were measured radiometrically. Prior to a distribution experiment, the organic phase was pre-equilibrated by contacting it 2-3 times with twice its volume of 1M $HNO_3$. A 1.00 mL aliquot of this pre-equilibrated organic phase was then combined with an equal volume of fresh 1M $HNO_3$ spiked with $^{85}Sr$. The two phases were mixed using a vortex mixer for one minute, then centrifuged until complete phase separation was obtained. The $^{85}Sr$ activity in each phase was measured by gamma counting using a Beckman Biogamma Counter. All measurements were performed at 25±0.5° C.

EXAMPLE 1

Figure 2:
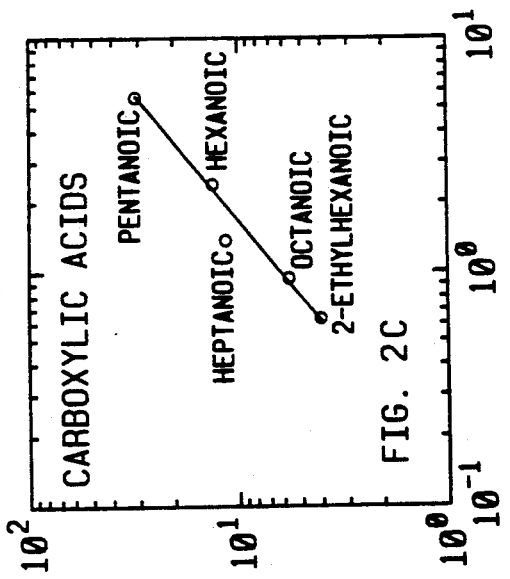
FIG. 2 is a series of graphs showing the relationship between the extraction constant for Sr and the molarity of water in various diluents containing bis-[(t-butyl)cyclohexano]-18-crown-6 (Dt-BuCH18C6).
Figure 2:
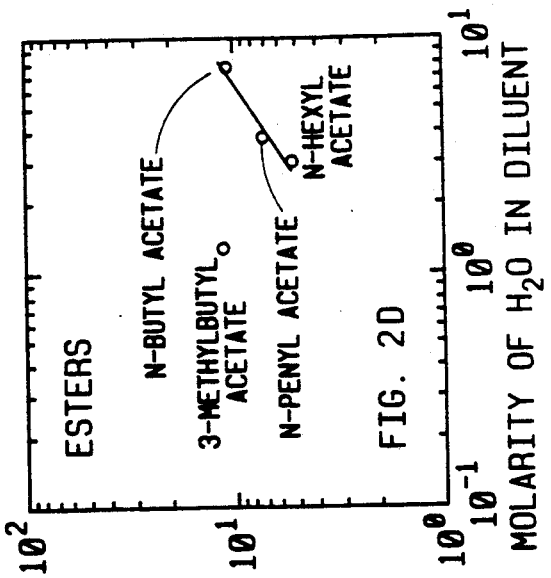
Figure 2:
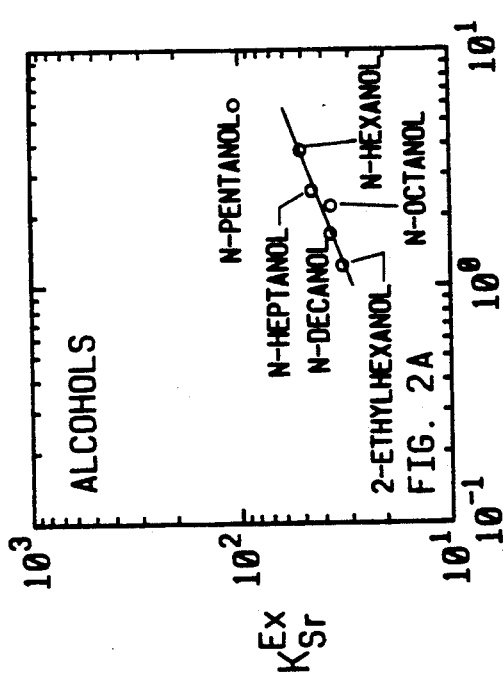
Figure 2:
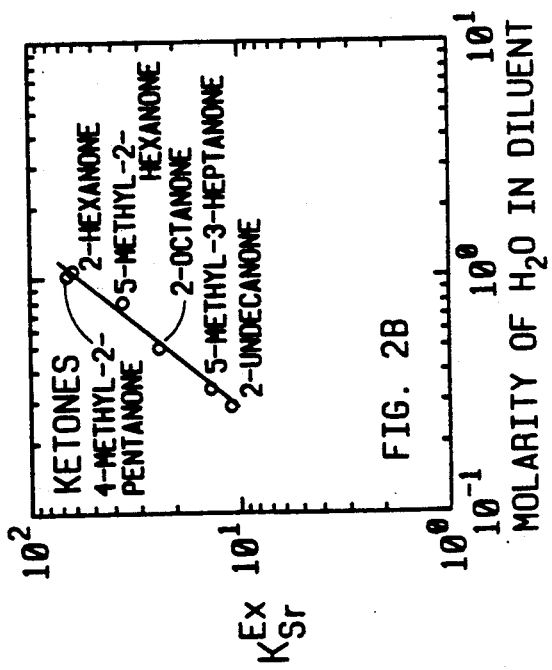

A series of experiments were made to correlate the distribution of strontium with the molarity of water in a variety of diluents. 1 ml portions of 0.5M DCH18C6 or 0.1M Dt-BuCH18C6 in the various organic diluents were contacted with 1.0M $HNO_3$ spiked with $^{85}Sr$. The results, grouped by diluent types, are shown in FIGS. 1 and 2 respectively. They show the positive effect of increasing water content in the diluent on the strontium extraction constant.

EXAMPLE 2

Another series of experiments were run in the manner described above in order to determine the influence of acidity on the distribution ratios of the inert constituents and fissions products contained in a synthetic dissolved waste sludge (DWS) using 0.375M DCH18C6 and 0.125M Aliquat in octanoic acid. Aliquat 336, which is tricaprylylmethylammonium nitrate, was introduced into the organic phase to create an environment more favorable for ion pair formation. The results are shown in Table 1 below.

TABLE 1

Effect of Acidity Upon distribution Ratios of DSW Constituents
System: 0.375 $\underline{M}$ DCH18C6/0.125 $\underline{M}$ Aliquat 336 in OA vs. DSW @ Various $HNO_3$) Concentrations.

| | Distribution Ratios | | |
|---|---|---|---|
| | 1 M | 3 M | 6 M |
| Inert Constituents | | | |
| Na | 0.37 | 0.41 | 0.21 |
| Mg | 0.14 | 0.09 | 0.05 |
| Al | 0.14 | 0.10 | 0.06 |
| Ca | 0.15 | 0.17 | 0.19 |
| Cr | 0.14 | 0.10 | 0.06 |
| Mn | 0.14 | 0.10 | 0.06 |
| Fe | 0.14 | 0.10 | 0.06 |
| Ni | 0.14 | 0.10 | 0.06 |
| Cu | 0.14 | 0.10 | 0.06 |
| Fission Products | | | |
| Sr | 2.4 | 3.8 | 5.8 |
| Y | 0.14 | 0.09 | 0.06 |
| Zr | 0.09 | 0.10 | 0.12 |
| Mo | 0.15 | 0.12 | <0.10 |
| Ru | 0.17 | 0.15 | 0.11 |
| Rh | 0.15 | 0.10 | <0.06 |
| Pd | 0.20 | <0.20 | <0.24 |
| Ag | <0.20 | <0.20 | <0.20 |
| Cd | 0.14 | <0.11 | <0.13 |
| Cs | 0.27 | 0.16 | 0.03 |
| Ba | 1.4 | 1.9 | 2.2 |
| La | 0.14 | 0.10 | 0.08 |
| Ce | 0.14 | 0.12 | 0.08 |
| Pr | 0.14 | 0.09 | 0.07 |
| Nd | 0.17 | 0.13 | 0.10 |
| Sm | 0.13 | 0.07 | 0.05 |
| Eu | 0.14 | 0.10 | 0.07 |

The data show that only Sr, Ba, and Zr distribution ratios increase with acidity: in all other cases D's decrease.

EXAMPLE 3

The effect of changing diluent on $D_{Sr}$ was studied using solutions of DCH18C6 in using 2-ethylhexanol, n-octanol, and n-decanol. A comparison of $D_{Sr}$ using the above three alcohols and n-octanoic acid is shown in Table 2 below.

TABLE 2

Comparison of $D_{Sr}$ using 0.1 $\underline{M}$ DCH18C6 in octanoic acid, 2-ethylhexanol, n-octanol, and n-decanol, 25° C.

| | DSr | |
|---|---|---|
| Diluent | 1M HNO3 | 3M HNO3 |
| octanoic acid | 0.35 | 0.66 |
| 2-Ethylhexanol | 0.57 | 2.0 |
| n-octanol | 0.71 | 3.1 |
| n-decanol | 0.36 | 1.6 |

The results show that n-octanol is more effective in increasing $D_{Sr}$ than either 2-ethylhexanol or n-decanol and more effective than octanoic acid, especially at 3M $HNO_3$.

EXAMPLE 4

Figure 3:
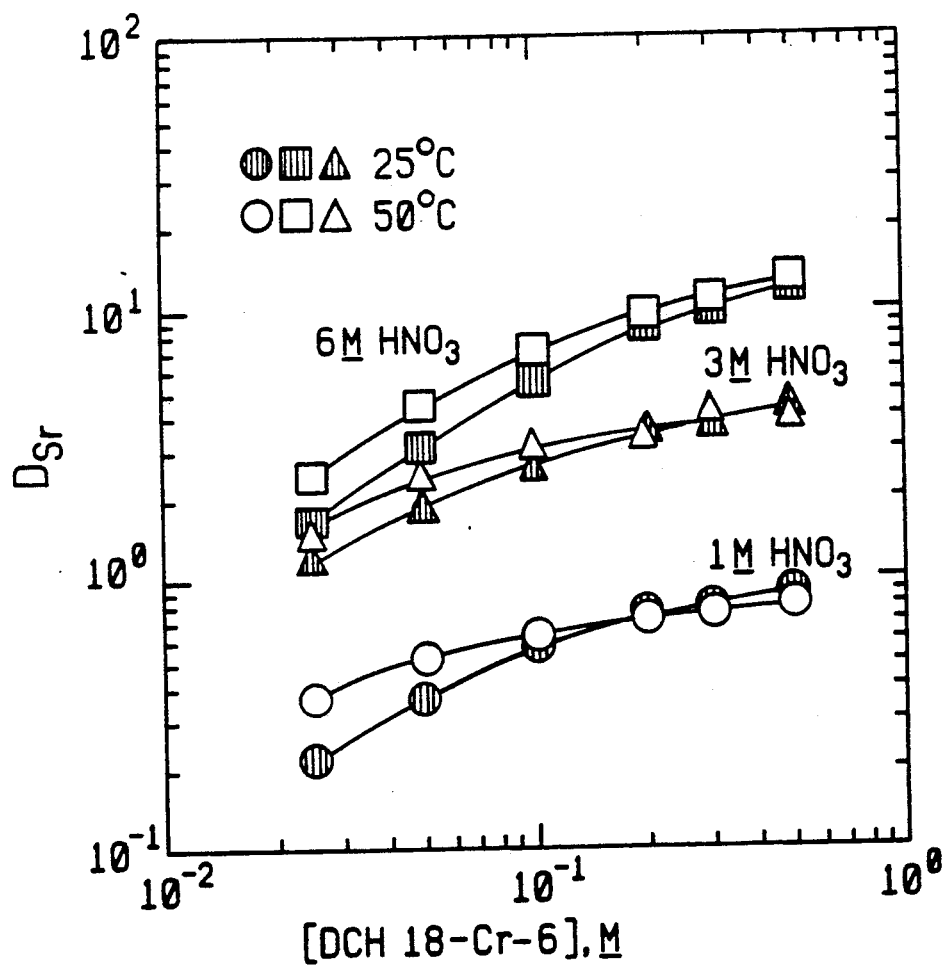
FIG. 3 is a graph of the extractant dependence of $D_{Sr}$ obtained with 0.25M DCH18C6 in 1-octanol from nitric acid solutions of increasing molarity at 2 different temperatures.

The extractant dependencies of $D_{Sr}$ with DCH18C6 in n-octanol from 1, 3, and 6M $HNO_3$ at 25° and 50° C. are shown in FIG. 3. Under all conditions, the extractant dependencies are less than 1st power, although dependency increases as the concentration of DCH18C6 decreases. The $D_{Sr}$ extractant dependency is also slightly higher when the extraction takes place from 6M rather than 1M HNO₃. Temperature is also shown to have little effect until the concentration of crown is less than 0.1M.

EXAMPLE 5

Figure 4:
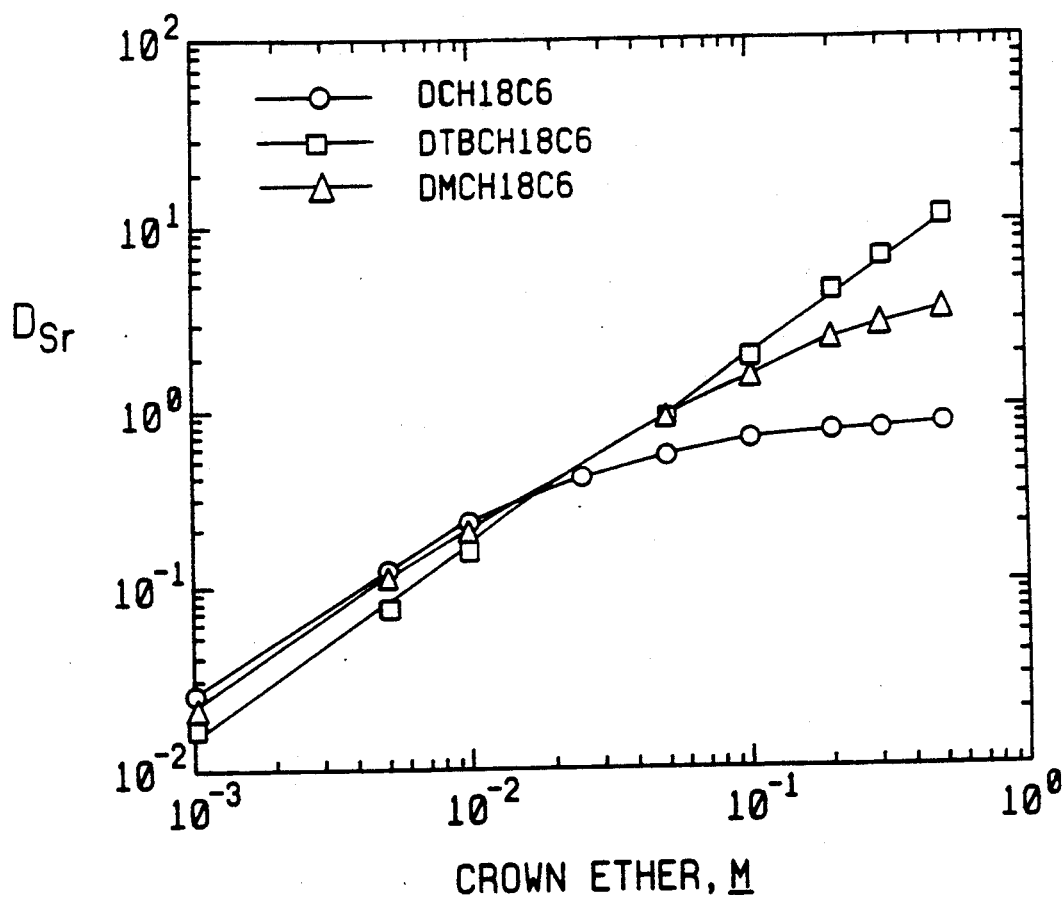
FIG. 4 is graph comparing the extractant dependence of $D_{Sr}$ obtained with several crown ethers in 1-octanol from 1.0M $HNO_3$.

The extractant dependencies of $D_{Sr}$ with DHC18C6, Dt-BuCH18C6, and bis-4,4'(5')-(methylcyclohexano)-18-Crown-6 (DMeCH18C6) in n-octanol from 1M HNO₃ at 25° C. are shown in FIG. 4. As may be seen, each of the three extractants is equally effective at low contentration (about 0.01M). At concentrations high enough to yield acceptable $D_{Sr}$ values however, the di-t-butyl compound gives distribution ratios a factor of 5 or more greater than does DCH18C6 and at least twice those for the dimethyl compound.

EXAMPLE 6

The distribution ratios of a number of inert constituents and fission products were measured at 40° C. from synthetic dissolved sludge waste with 0.25M and 0.50M DCH18C6 in n-octanol using the experimental methods hereinbefore described. Measurements were also carried out using n-octanol without crown ether for comparison. The results are given in Table 3 below.

TABLE 3

Distribution Ratios of Inert Constituents and Fission Products from Dissolved Sludge Waste
(1M HNO₃—0.5M Al) T = 40° C.

| | | Distribution Ratios | |
|---|---|---|---|
| | n-Octanol | 0.25M DCH18C6 in n-Octanol | 0.5M DCH18C6 in n-Octanol |
| Inert Constituents | | | |
| Na | 0.02 | 0.30 | 0.49 |
| Mg | 0.02 | 0.07 | 0.02 |
| Al | 0.02 | 0.07 | 0.02 |
| Ca | 0.03 | 0.15 | 0.18 |
| Cr | 0.03 | 0.07 | 0.02 |
| Mn | 0.03 | 0.07 | 0.02 |
| Fe | 0.03 | 0.07 | 0.02 |
| Ni | 0.03 | 0.08 | 0.02 |
| Cu | 0.03 | 0.08 | 0.03 |
| Fission Products | | | |
| Sr | 0.02 | 4.1 | 5.0 |
| Y | 0.02 | 0.08 | 0.02 |
| Zr | 0.04 | 0.10 | 0.06 |
| Mo | 0.15 | 0.26 | 0.18 |
| Ru | 0.25 | 0.52 | 0.53 |
| Rh | 0.03 | <0.05 | <0.05 |
| Pd | 0.21 | 0.47 | 0.71 |
| Ag | <0.05 | <0.2 | 0.10 |
| Cd | 0.02 | 0.10 | 0.03 |
| Cs | — | (0.11) | (0.33) |
| Ba | 0.03 | 1.3 | 1.5 |
| La | 0.03 | 0.08 | 0.02 |
| R.E.'s | 0.01–0.04 | 0.04–0.11 | 0.01–0.05 |

() Radiometric Determination

The data show that D is greater than one only for Sr and Ba. While Na, Ru, and Pd show some extractability, the distribution for the strontium is sufficiently higher to achieve complete separation. The data also show that selectivity is not significantly different for the two DCH18C6 concentrations and that n-octanol makes an appreciable contribution to the D's of all constituents except Sr and Ba.

EXAMPLE 7

A series of experiments were run to study the affect of HNO₃ concentration on the D's using 0.5M DCH18C6 solution. The results are shown in Table 4 below.

TABLE 4

Effect of Acidity Upon Distribution Ratios of DSW Constituents, 40° C.
System: 0.502M DCH18C6 in Octyl Alcohol vs. DSW @ Various HNO₃ Concentrations

| | | Distribution Ratios | | |
|---|---|---|---|---|
| | | 1 M | 3 M | 6 M |
| Inert Constituents | | | | |
| | Na | 0.45 | 0.41 | 0.16 |
| | Mg | 0.09 | 0.05 | 0.05 |
| | Al | 0.09 | 0.06 | 0.06 |
| | Ca | 0.15 | 0.23 | 0.24 |
| | Cr | 0.09 | 0.06 | 0.06 |
| | Mn | 0.09 | 0.06 | 0.06 |
| | Fe | 0.09 | 0.06 | 0.06 |
| | Ni | 0.09 | 0.06 | 0.06 |
| | Cu | 0.09 | 0.06 | 0.06 |
| Fission Products | | | | |
| | Sr | 2.0 | 6.9 | 15.0 |
| | Y | 0.09 | 0.06 | 0.06 |
| | Zr | 0.10 | 0.12 | 0.21 |
| | Mo | 0.20 | 0.23 | 0.27 |
| | Ru | 0.40 | 0.41 | 0.23 |
| | Rh | 0.12 | 0.09 | 0.06 |
| | Pd | 0.67 | 0.58 | 0.29 |
| | Ag | <0.2 | <0.2 | <0.2 |
| | Cd | <0.1 | <0.1 | <0.13 |
| | Cs | 0.34 | 0.18 | 0.03 |
| | Ba | 0.91 | 2.6 | 3.6 |
| | La | 0.10 | 0.07 | 0.08 |
| | Ce | 0.10 | 0.08 | 0.08 |
| R.E.'s | Pr | 0.09 | 0.06 | 0.07 |
| | Nd | 0.12 | 0.10 | 0.10 |
| | Sm | 0.07 | 0.03 | 0.05 |
| | Eu | 0.10 | 0.06 | 0.07 |

The data show clearly that the selectivity of Sr over every cationic constituent increases with an increase in acidity, which parallels the behavior of the corresponding octanoic acid system.

EXAMPLE 8

Figure 5:
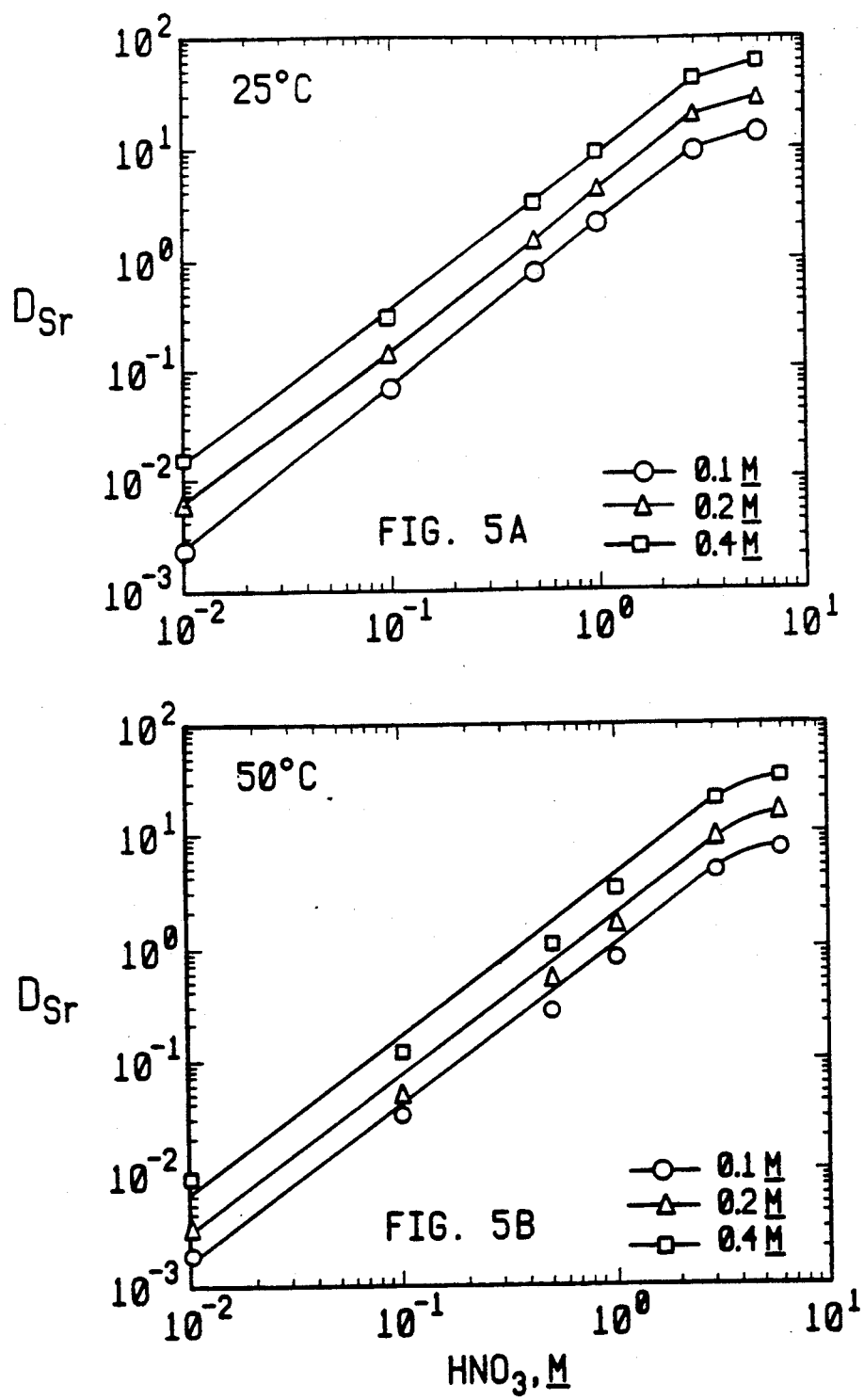
FIG. 5 is a pair of graphs showing the acid dependence of $D_{Sr}$ obtained with bis-[(t-butyl)cyclohexano]-18-Crown-6 at two different temperatures and at several ether concentrations.

Another series of experiments were run in the manner described above to determine the $D_{Sr}$ from nitric acid solutions with Dt-BuCH18C6 at several concentrations in n-octanol at 25° and 50° C. The results, as shown in FIGS. 5a and 5b, illustrate that Sr extraction continues to improve as the acidity of the aqueous phase increases up to 6M HNO₃. The figures further illustrate that the temperature has little effect upon distribution ratios.

EXAMPLE 9

The extraction of technetium from nitric acid solutions of various acidities using 0.20M Dt-BuHC18C6 in n-octanol was studied in the manner described above. The distribution ratios of Tc were measured radiometrically using liquid scintillation counting The results are given in Table 5 below.

TABLE 5

$D_{TC}$ using 0.20 D-t-BuCH18C6 in n-octanol at various acidities

| [HNO₃] M | $D_{TC}$ |
|---|---|
| 0.010 | 0.12 |
| 0.10 | 0.24 |
| 0.5 | 0.69 |
| 1.0 | 1.25 |

TABLE 5-continued $D_{TC}$ using 0.20 D-t-BuCH18C6 in n-octanol at various acidities

| [HNO$_3$] M | $D_{TC}$ |
|---|---|
| 3.0 | 1.85 |
| 6.0 | 1.61 |

The data from the table above show that, as with strontium, the $D_{Tc}$ increases with increasing nitric acid concentration.

As has been shown by the preceding discussion and Examples, the process of the invention provides a safe and effective means for the recovery of Sr and Tc values from aqueous solutions up to 6 molar in nitric acid which contain these and other metal values.

The embodiment of the invention in which an exclusive property or privilege is claimed is defined as follows:

1. A process of recovering strontium and/or technetium values from an aqueous nitric acid feed solution containing nitric acid and fission product values comprising:
    contacting the aqueous solution containing of about 1-6 molar nitric acid and technetium and strontium values with an extractant consisting of a crown ether in a diluent, the diluent being an organic compound which is insoluble in water, is capable of dissolving at least 0.5M molar water, and in which the ether is soluble,
    maintaining the contact for a period of time sufficient for the strontium and technetium values in the feed solution to be taken up by the extractant, and
    separating the extractant from the feed solution, thereby separating the strontium and technetium values from the aqueous nitric acid solution.

2. The process of claim 1 wherein the feed solution contains up to 6 molar nitric acid.

3. The process of claim 2 wherein the extractant is from about 0.1 to 0.5M in crown ether.

4. The process of claim 3 wherein the diluent is a member selected from the group consisting of alcohols, ketones, carboxylic acids and esters.

5. The process of claim 4 wherein the crown ether has the formula: 4,4'(5')[(R,R')cyclohexano]-18-crown-6, where R and R' are one or more members selected from the group consisting of H, methyl, t-butyl, and heptyl.

6. The process of claim 4 wherein the diluent is an alcohol selected from the group consisting of 1-octanol, 1-heptanol and 1-decanol.

7. The process of claim 4 wherein the diluent is a carboxylic acid selected from the group consisting of octanoic acid, heptanoic acid and hexanoic acid.

8. The process of claim 4 wherein the diluent is a ketone selected from the group consisting of 2-hexanone and 4-methyl-2-pentone.

9. The process of claim 4 wherein the diluent is a ester selected from the group consisting of butyl acetate and amyl acetate.

10. The process of claim 6 wherein the crown ether is selected from the group consisting of dicyclohexano-18-crown-6, bis-methylcyclohexano-18-crown-6, and bis 4,4'(5')[(t-butyl)cyclohexano]-18-crown-6.

11. The process of claim 7 wherein the crown ether is selected from the group consisting of dicyclohexano-18-crown-6, bis-methylcyclohexano-18-crown-6, and bis 4,4'(5')[(t-butyl)cyclohexano]-18-crown-6.

12. The process of claim 8 wherein the crown ether is selected from the group consisting of dicyclohexano-18-crown-6, bis-methylcyclohexano-18-crown-6, and bis 4,4'(5')[(t-butyl)cyclohexano]-18-crown-6.

13. The process of claim 9 wherein the crown ether is selected from the group consisting of dicyclohexano-18-crown-6, bis-methylcyclohexano-18-crown-6, and bis 4,4'(5')[(t-butyl)cyclohexano]-18-crown-6.

14. The process of claim 6 wherein the diluent is 1-octanol and the crown ether is selected from the group consisting of dicyclohexano-18-crown-6, bis-methylcyclohexano-18-crown-6, and bis 4,4'(5')[(t-butyl)cyclohexano]-18-crown-6.

15. The process of claim 14 wherein the crown ether is bis 4,4'(5')[(t-butyl)cyclohexano]-18-crown-6.

16. A process for recovering strontium and/or technetium values from an aqueous feed solution containing nitric acid together with other fission product values comprising:
    contacting the nitric acid solution of about 1 to 6 molar nitric acid with an extractant consisting of from 0.1 to 0.5M of a crown ether in a diluent, the crown ether being selected from the group consisting of dicyclohexano-18-crown-6, bis-methylcyclohexano-18-crown-6, and 4,4'(5')[(t-butyl)cyclohexano]-18-crown-6, and the diluent being selected from the group consisting of 1-octanol, 1-heptanol, 1-decanol, octanoic acid, heptanoic acid, hexanoic acid, 2-hexanone, 4-methyl-2-pentanone, butyl acetate and amyl acetate,
    maintaining this contact for a period of time sufficient for the strontium and technetium values in the feed solution to be taken up by the extractant, and
    separating the extractant from the feed solution, thereby separating the strontium and technetium values from the nitric acid feed solution.

* * * * *